United States Patent
Ueda et al.

(10) Patent No.: US 6,676,853 B1
(45) Date of Patent: Jan. 13, 2004

(54) PHOSPHOR FOR VACUUM ULTRAVIOLET EXCITATION MATERIAL

(75) Inventors: Kyota Ueda, Sendai (JP); Tadashi Endo, Iwanuma (JP); Keiji Ono, Tsukuba (JP); Susumu Miyazaki, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/694,034

(22) Filed: Oct. 23, 2000

(30) Foreign Application Priority Data

| Oct. 27, 1999 | (JP) | 11-305353 |
| Oct. 27, 1999 | (JP) | 11-305354 |
| Oct. 27, 1999 | (JP) | 11-305355 |
| Oct. 27, 1999 | (JP) | 11-305356 |
| Oct. 27, 1999 | (JP) | 11-305357 |

(51) Int. Cl.$^7$ .................. C09K 11/64; C09K 11/08; C09K 11/78; C09K 11/180
(52) U.S. Cl. .................................. 252/301.4 R
(58) Field of Search ........................ 252/301.4 R

(56) References Cited

U.S. PATENT DOCUMENTS

| 4,215,289 A | * | 7/1980 | De Hair et al. | 252/301.4 R |
| 4,926,091 A | * | 5/1990 | Verlijsdonk et al. | 252/301.4 R |
| 4,946,621 A | * | 8/1990 | Fouassier et al. | 252/301.4 R |
| 6,083,319 A | * | 7/2000 | Aka et al. | 117/13 |

FOREIGN PATENT DOCUMENTS

| FR | 2597851 |   | 10/1987 |
| JP | 52-28745 | * | 7/1977 |
| JP | 52028745 |   | 7/1977 |
| JP | 56-155281 | * | 12/1981 |
| JP | 4-46988 | * | 2/1992 |
| JP | 4-198295 | * | 7/1992 |
| JP | 290648 |   | 10/2000 |
| JP | 2000-290648 | * | 10/2000 |

* cited by examiner

Primary Examiner—C. Melissa Koslow
(74) Attorney, Agent, or Firm—Sughrue Mion, PLLC

(57) ABSTRACT

The present invention provides a phosphor for a vacuum ultraviolet (VUV) excitation material, obtained by adding Eu or Tb to a compound comprising Gd, Al and O.

The present invention also provides a phosphor for a vacuum ultraviolet excitation material, obtained by adding Eu or Tb to a compound comprising Gd, Al, B and O.

The present invention further provides a phosphor for a vacuum ultraviolet excitation material, obtained by adding Eu to a compound comprising Gd, M, B and O, wherein M represents one or more alkaline earth metal elements selected from the group consisting of Ca, Sr and Ba.

14 Claims, No Drawings

PHOSPHOR FOR VACUUM ULTRAVIOLET EXCITATION MATERIAL

TECHNICAL FIELD OF THE INVENTION

The present invention relates to a phosphor for a vacuum ultraviolet (VUV) excitation material and a vacuum ultraviolet material. More particularly, the present invention relates to a phosphor suitable for a vacuum ultraviolet excitation material such as a plasma display panel (hereinafter, referred to as "PDP"), rare gas lamp and the like, and a vacuum ultraviolet material using said phosphor.

BACKGROUND OF THE INVENTION

Recently, there are flourishing developments of a vacuum ultraviolet excitation material having a structure in which a phosphor is excited for light emission by a vacuum ultraviolet ray radiated by rare gas discharge. A typical example thereof is development of PDP. PDP is noticed as a flat panel display which can substitute for a cathode ray tube, since it can realize a large scale and thin image. PDP is a display material constituted by placing a lot of minute discharge spaces (hereinafter, may be abbreviated as display cell) in the form of matrix, and wherein, a discharge electrode is provided in each display cell, and a phosphor is applied on the inner wall of each display cell. A rare gas such as He—Xe, Ne—Xe, Ar and the like is filled in a space of each display cell, and by applying voltage to a discharge electrode, discharge of the rare gas occurs in the display cell and a vacuum ultraviolet ray is radiated. A phosphor is excited by this vacuum ultraviolet ray, leading to emission of a visible light. An image is displayed by light emission of phosphors of display cells at given positions of a display material. Full color display can be effected by using phosphors emitting blue, green and red lights, respectively, as the phosphor used in each display cell, and applying them to form matrix.

Recently, harmful mercury tends to be reduced due to environmental problems, and there is a notice on a rare gas lamp in which discharge only of a rare gas using no mercury is effected to discharge a vacuum ultraviolet ray for excitation of a phosphor, leading to light emission. There are developments of a phosphor which is excited for emission by a vacuum ultraviolet ray and the like radiated by rare gas discharge. For example, for PDP, $BaMgAl_{10}O_{17}$:Eu, $Zn_2SiO_4$:Mn and (Y, Gd)$BO_3$:Eu are utilized practically as a blue phosphor, green phosphor and red phosphor, respectively. However, for enhancement of properties of full color PDP, improvements of brilliance, color purity, life and the like of a phosphor have been desired.

SUMMARY OF THE INVENTION

An object of the present invention is to provide a phosphor having excellent emission efficiency used for a vacuum ultraviolet excitation material such as PDP and the like, and a vacuum ultraviolet excitation material using said phosphor.

Under these conditions, the present inventors have intensively studied to solve the above-described problems, and resultantly, found that a phosphor obtained by activation by addition of an Eu3+ ion or Tb3+ ion to a mother crystal system of a Gd—Al—O component system or Gd—Y—Al—O component system is useful.

Further, the present inventors have found that a phosphor obtained by activation by addition of an Eu3+ ion or Tb3+ ion to a mother crystal system of a Gd—Al—$BO_3$ component system or Gd—Y—Al—$BO_3$ component system is useful.

Further, the present inventors have found that a phosphor obtained by activation by addition of an Eu3+ ion to a mother crystal system of a Gd—M—$BO_3$ component system wherein, M represents one or more alkaline earth metal elements selected from the group consisting of Ca, Sr and Ba, or Gd—Y—M—$BO_3$ component system is useful, and completed the present invention.

Namely, the present invention provides a phosphor for a vacuum ultraviolet (VUV) excitation material, obtained by adding Eu or Tb to a compound comprising Gd, Al and O.

The present invention also provides a phosphor for a vacuum ultraviolet excitation material, obtained by adding Eu or Tb to a compound comprising Gd, Al, B and O.

The present invention further provides a phosphor for a vacuum ultraviolet excitation material, obtained by adding Eu to a compound comprising Gd, M, B and O, wherein M represents one or more alkaline earth metal elements selected from the group consisting of Ca, Sr and Ba.

DETAILED DESCRIPTION OF THE INVENTION

First, a phosphor for a vacuum ultraviolet excitation material of a Gd—Al—O component system will be described.

The phosphor for a vacuum ultraviolet excitation material of the present invention is a red phosphor obtained by adding Eu as an activating agent to a compound comprising Gd, Al and O, or a green phosphor obtained by adding Tb as an activating agent to a compound comprising Gd, Al and O.

When Eu (Eu3+ ion) is added as an activating agent to a mother crystal system of a Gd—Al—O component system, a phosphor for a vacuum ultraviolet excitation material is preferably represented by the general formula $Gd_{1-a}Eu_aAlO_3$ wherein $0.003 \leq a \leq 0.5$.

When Tb (Tb3+ ion) is added as an activating agent to

When Tb (Tb3+ ion) is added as an activating agent to a mother crystal system of a Gd—Al—O component system, a phosphor for a vacuum ultraviolet excitation material is preferably represented by the general formula $Gd_{1-a}Tb_aAlO_3$ wherein $0.003 \leq a \leq 0.5$.

When Eu (Eu3+ ion) or Tb (Tb3+ ion) is added as an activating agent to a mother crystal system of a Gd—Y—Al—O component system prepared by substituting a part of Gd with yttrium (Y), a phosphor in which 0.5 to 95 mol % of Gd is substituted by Y is preferable.

In a phosphor obtained by substituting a part of Gd in the general formula $Gd_{1-a}Eu_aAlO_3$ a with Y, the composition ratio "a" of Eu effective as an activating agent for the phosphor is preferably 0.003 to 0.5, from the standpoint of emission strength.

In a phosphor obtained by substituting a part of Gd in the general formula $Gd_{1-a}Tb_aAlO_3$ with Y, the composition ratio "a" of Eu effective as an activating agent for the phosphor is preferably 0.003 to 0.5, from the standpoint of emission strength.

Further, a phosphor for a vacuum ultraviolet excitation material of the present invention can also be applied to a phosphor excited by a ultraviolet ray, X-ray and electron beam out of the vacuum ultraviolet range, and to a material using the phosphor.

The method for producing (synthesis method) a phosphor of the present invention is not particularly restricted, and for example, the phosphor is produced by compounding respective phosphor raw materials in a given component composition as described below. As the aluminum raw material, there can be used α-alumina, γ-alumina having high purity of 99.9% or more, or aluminum hydroxide, nitrate (salt), halide and the like having high purity of 99.9% or more, and as the gadolinium raw material and yttrium raw material, there can be used an oxide having high purity of 99.9% or more, or hydroxide, carbonate (salt), nitrate (salt), halide, oxalate (salt) and the like having high purity of 99.9% or more, which can be decomposed at higher temperature to become an oxide.

As the europium raw material or terbium raw material which will become an activating agent for causing emission on the above-mentioned phosphor, there can be used, an oxide having high purity of 99.9% or more, or hydroxide, carbonate (salt), nitrate (salt), halide, oxalate (salt) and the like likewise having high purity of 99.9% or more, which can be decomposed at higher temperature to become an oxide.

These raw materials are mixed by using a ball mill, V-shape mixer, stirring apparatus and the like, then, the mixture is calcined for several hours at temperature of from 900° C. to 1100° C., to obtain a phosphor. When a hydroxide, carbonate (salt), nitrate (salt), halide, oxalate (salt) and the like, which can be decomposed at higher temperature to become an oxide is used as a raw material, it is also possible to conduct pre-calcination at temperature of from 600° C. to 800° C. before the main calcination.

The calcination atmosphere in this case is not particularly restricted, and an oxygen atmosphere, air and the like are preferable. For promoting the calcination reaction, a flux in a suitable amount may also be added.

Further, a product obtained by the above-mentioned method is ground by using a ball mill, jet mill and the like, then, washed, and if necessary, classified. Further, for further enhancing crystallinity of the resulted phosphor, re-calcination is conducted if necessary.

According to the present invention, a phosphor having high emission strength is obtained which is suitable for a vacuum ultraviolet excitation material such as PDP, rare gas lamp and the like, and a vacuum ultraviolet excitation material having high brilliance can be realized, providing industrially extreme usefulness.

Then, a phosphor for a vacuum ultraviolet excitation material of a Gd—Al—$BO_3$ component system will be illustrated.

A phosphor for a vacuum ultraviolet excitation material of the present invention is a red phosphor obtained by adding Eu as an activating agent to a compound comprising Gd, Al, B and O, or a green phosphor obtained by adding Tb as an activating agent to a compound comprising Gd, Al, B and When Eu (Eu3+ ion) is added as an activating agent to a mother crystal system of a Gd—Al—$BO_3$ component system, a phosphor for a vacuum ultraviolet excitation material is preferably represented by the general formula $Gd_{1-a}Eu_aAl_3(BO_3)_4$ wherein $0.003 \leq a \leq 0.5$.

When Tb(Tb3+ ion) is added as an activating agent to a mother crystal system of a Gd—Al—$BO_3$ component system, a phosphor for a vacuum ultraviolet excitation material is preferably represented by the general formula $Gd_{1-a}Tb_aAl_3(BO_3)_4$ wherein $0.003 \leq a \leq 0.5$.

When Eu (Eu3+ ion) or Tb (Tb3+ ion) is added as an activating agent to a mother crystal system of a Gd—Y—Al—$BO_3$ component system prepared by substituting a part of Gd with yttrium (Y), a phosphor in which 0.5 to 95 mol % of Gd is substituted by Y is preferable.

In a phosphor obtained by substituting a part of Gd in the general formula $Gd_{1-a}Eu_aAl_3(BO_3)_4$ with Y, the composition ratio "a" of Eu effective as an activating agent for the phosphor is preferably 0.003 to 0.5, from the standpoint of emission strength.

In a phosphor obtained by substituting a part of Gd in the general formula $Gd_{1-a}Tb_aAl_3(BO_3)_4$ with Y, the composition ratio "a" of Tb effective as an activating agent for the phosphor is preferably 0.003 to 0.5, from the standpoint of emission strength.

Further, a phosphor for a vacuum ultraviolet excitation material of the present invention can also be applied to a phosphor excited by a ultraviolet ray, X-ray and electron beam out of the vacuum ultraviolet range, and to a material using the phosphor.

The method for producing (synthesis method) a phosphor of the present invention is not particularly restricted, and for example, the phosphor is produced by compounding respective phosphor raw materials in a given component composition as described below. As the aluminum raw material, there are used α-alumina, γ-alumina having high purity of 99.9% or more, or aluminum hydroxide, nitrate (salt), halide and the like having high purity of 99.9% or more, and as the boron raw material, there are used boron oxide, boric acid and the like having high purity. As the gadolinium raw material and yttrium raw material, there can be used an oxide having high purity of 99.9% or more, or hydroxide, carbonate (salt), nitrate (salt), halide, oxalate (salt) and the like having high purity of 99.9% or more, which can be decomposed at higher temperature to become an oxide.

As the europium raw material or terbium raw material which will become an activating agent for causing emission on the above-mentioned phosphor, there can be used an oxide having high purity of 99.9% or more, or hydroxide, carbonate (salt), nitrate (salt), halide, oxalate (salt) and the like likewise having high purity of 99.9% or more, which can be decomposed at higher temperature to become an oxide.

These raw materials are mixed by using a ball mill, V-shape mixer, stirring apparatus and the like, then, the mixture is calcined for several hours at temperature of from 900° C. to 1100° C., to obtain a phosphor. When a hydroxide, carbonate (salt), nitrate (salt), halide, oxalate (salt) and the like, which can be decomposed at higher temperature to become an oxide is used as a raw material, it is also possible to conduct pre-calcination at temperature of from 600° C. to 800° C. before the main calcination.

The calcination atmosphere in this case is not particularly restricted, and an oxygen atmosphere, air and the like are preferable. For promoting the calcination reaction, a flux in a suitable amount may also be added.

Further, a product obtained by the above-mentioned method is ground by using a ball mill, jet mill and the like, then, washed, and if necessary, classified. Further, for further enhancing crystallinity of the resulted phosphor, re-calcination is conducted if necessary.

According to the present invention, a phosphor having high emission strength is obtained which is suitable for a vacuum ultraviolet excitation material such as PDP, rare gas lamp and the like, and a vacuum ultraviolet excitation material having high brilliance can be realized, providing industrially extreme usefulness.

Finally, a phosphor for a vacuum ultraviolet excitation material of a Gd—M—$BO_3$ component system wherein M represents one or more alkaline earth metal elements selected from the group consisting of Ca, Sr and Ba will be illustrated.

A phosphor for a vacuum ultraviolet excitation material of the present invention is a red phosphor obtained by adding Eu as an activating agent to a compound comprising Gd, M, B and O, wherein M has the same meaning as described above.

When Eu (Eu3+ ion) is added as an activating agent to a mother crystal system of Gd—M—BO—$_3$ component system, a phosphor for a vacuum ultraviolet excitation material is preferably represented by the general formula $M_4Gd_{1-a}Eu_aO(BO_3)_3$ wherein $0.003 \leq a \leq 0.5$.

When Eu (Eu3+ ion) is added as an activating agent to a mother crystal system of a Gd—Y—M—$BO_3$ component system prepared by substituting a part of Gd with yttrium (Y), a phosphor in which 0.5 to 95 mol % of Gd is substituted by Y is preferable.

In a phosphor obtained by substituting a part of Gd in the general formula $M_4Gd_{1-a}Eu_aO(BO_3)_3$ with Y, the composition ratio "a" of Eu effective as an activating agent for the phosphor is preferably 0.003 to 0.5, from the standpoint of emission strength.

Further, a phosphor for a vacuum ultraviolet excitation material of the present invention can also be applied to a phosphor excited by a ultraviolet ray, X-ray and electron beam out of the vacuum ultraviolet range, and to a material using the phosphor.

The method for producing (synthesis method) a phosphor of the present invention is not particularly restricted, and for example, the phosphor is produced by compounding respective phosphor raw materials in a given component composition as described below. As the calcium, strontium and barium raw materials, there are used an oxide having high purity of 99.9% or more, or hydroxide, nitrate (salt), halide, oxalate (salt) and the like having high purity of 99.9% or more. As the gadolinium and yttrium raw materials, there can be used an oxide having high purity of 99.9% or more, or hydroxide, carbonate (salt), nitrate (salt), halide, oxalate (salt) and the like likewise having high purity of 99.9% or more, which can be decomposed at higher temperature to become an oxide.

As the europium raw material which will become an activating agent for causing emission on the above-mentioned phosphor, there can be used an oxide having high purity of 99.9% or more, orhydroxide, carbonate (salt), nitrate (salt), halide, oxalate (salt) and the like having high purity of 99.9% or more, which can be decomposed at higher temperature to become an oxide.

These raw materials are mixed by using a ball mill, V-shape mixer, stirring apparatus and the like, then, the mixture is calcined for several hours at temperature of from 900° C. to 1100° C., to obtain a phosphor. When a hydroxide, carbonate (salt), nitrate (salt), halide, oxalate (salt) and the like, which can be decomposed at higher temperature to become an oxide is used as a raw material, it is also possible to conduct pre-calcination at temperature of from 600° C. to 800° C. before the main calcination.

The calcination atmosphere in this case is not particularly restricted, and an oxygen atmosphere, air and the like are preferable. For promoting the calcination reaction, a flux in a suitable amount may also be added.

Further, a product obtained by the above-mentioned method is ground by using a ball mill, jet mill and the like, then, washed, and if necessary, classified. Further, for further enhancing crystallinity of the resulted phosphor, re-calcination is conducted if necessary.

According to the present invention, a phosphor having high emission strength is obtained which is suitable for a vacuum ultraviolet excitation material such as PDP, rare gas lamp and the like, and a vacuum ultraviolet excitation material having high brilliance can be realized, providing industrially extreme usefulness.

EXAMPLE

Then, the following examples illustrate the present invention further in detail, but dot not limit the scope of the present invention.

Example 1

Phosphor raw materials, 3.64 g of gadolinium oxide ($Gd_2O_3$), 7.92 g of aluminum nitrate nona-hydrate [$Al(NO_3)_3 \cdot 9H_2O$] and 0.19 g of europium oxide ($Eu_2O_3$) were mixed, then, to this was added nitric acid and the mixture was dissolved while stirring, to obtain a nitric acid aqueous solution of the above-described phosphor raw materials. The resulted nitric acid aqueous solution was heated and evaporated to dryness, to obtain a mixed nitrate of Gd, Eu and Al. The resulted mixed nitrate was filled in an alumina boat, and calcinated at a temperature of 1000° C. in air for 24 hours. Thus, a red phosphor was obtained having a composition represented by $Gd_{0.95}Eu_{0.05}AlO_3$. This phosphor was irradiated with an ultraviolet ray using an excimer 146 nm lamp (manufactured by Ushio Inc.) in a vacuum chamber of $5 \times 10^{-2}$ Torr or less, for manifestation of emission of a light having strong red color.

Example 2

A red emission phosphor having a composition represented by $Gd_{0.75}Y_{0.2}Eu_{0.05}AlO_3$ was obtained in the same manner as in Example 1. This phosphor was irradiated with an ultraviolet ray using an excimer 146 nm lamp (manufactured by Ushio Inc.) in a vacuum chamber of $5 \times 10^{-2}$ Torr or less, for manifestation of emission of a light having strong red color.

Example 3

Phosphor raw materials, 3.64 g of gadolinium oxide ($Gd_2O_3$), 7.92 g of aluminum nitrate nona-hydrate [$Al(NO_3)_3 \cdot 9H_2O$] and 0.19 g of terbium oxide ($Tb_2O_3$) were mixed, then, to this was added nitric acid and the mixture was dissolved while stirring, to obtain a nitric acid aqueous solution of the above-described phosphor raw materials. The resulted nitric acid aqueous solution was heated and evaporated to dryness, to obtain a mixed nitrate of Gd, Tb and Al. The resultedmixed nitrate was filled in an alumina boat, and calcinated at a temperature of 100° C. in air for 24 hours. Thus, a green phosphor was obtained having a composition represented by $Gd_{0.95}Tb_{0.05}AlO_3$. When this phosphor was excited, for example, by a bright line of 146 nm radiated by discharge in a He—Xe mixed gas, green light emission of high brilliance was manifested.

Example 4

Phosphor raw materials, 3.64 g of gadolinium oxide ($Gd_2O_3$), 23.77 g of aluminum nitrate nona-hydrate [$Al(NO_3)_3 \cdot 9H_2O$], 2.94 g of boron oxide ($B_2O_3$) and 0.19 g of europium oxide ($Eu_2O_3$) were mixed, then, to this was added nitric acid and the mixture was dissolved while stirring, to obtain a nitric acid aqueous solution of the above-described phosphor raw materials. The resulted nitric acid aqueous solution was heated and evaporated to dryness, to obtain a mixed nitrate of Gd, Eu, Al and B. The resulted mixed nitrate was filled in an alumina boat, and calcinated at a temperature of 1000° C. in air for 24 hours. Thus, a red phosphor was obtained having a composition represented by $Gd_{0.95}Eu_{0.05}Al_3(BO_3)_4$. This phosphor was irradiated with an ultraviolet ray using an excimer 146 nm lamp (manufactured by Ushio Inc.) in a vacuum chamber of $5 \times 10^{-2}$ Torr or less, for manifestation of emission of a light having strong red color.

Example 5

A red emission phosphor having a composition represented by $Gd_{0.75}Y_{0.2}Eu_{0.05}Al_3(BO_3)_4$ was obtained in the same manner as in Example 4. This phosphor was irradiated with an ultraviolet ray using an excimer 146 nm lamp (manufactured by Ushio Inc.) in a vacuum chamber of $5 \times 10^{-2}$ Torr or less, for manifestation of emission of a light having strong red color.

Example 6

Phosphor raw materials, 3.64 g of gadolinium oxide ($Gd_2O_3$), 23.76 g of aluminum nitrate nona-hydrate [$Al(NO_3)_3 \cdot 9H_2O$], 2.94 g of boron oxide ($B_2O_3$) and 0.19 g of terbium oxide ($Tb_2O_3$) were mixed, then, to this was added nitric acid and the mixture was dissolved while stirring, to obtain a nitric acid aqueous solution of the above-described phosphor raw materials. The resulted nitric acid aqueous solution was heated and evaporated to dryness, to obtain a mixed nitrate of Gd, Tb, Al and B. The resulted mixed nitrate was filled in an alumina boat, and calcinated at a temperature of 1000° C. in air for 24 hours. Thus, a green phosphor was obtained having a composition represented by $Gd_{0.95}Tb_{0.05}Al_3(BO_3)_4$. When this phosphor was excited, for example, by a bright line of 146 nm radiated by discharge in a He—Xe mixed gas, green light emission of high brilliance was manifested.

Example 7

Phosphor raw materials, 4.40 g of calcium oxide (CaO), 3.38 g of gadolinium oxide ($Gd_2O_3$), 2.05 g of boron oxide ($B_2O_3$) and 0.17 g of europium oxide ($Eu_2O_3$) were mixed, then, to this was added nitric acid and the mixture was dissolved while stirring, to obtain a nitric acid aqueous solution of the above-described phosphor raw materials. The resulted nitric acid aqueous solution was heated and evaporated to dryness, to obtain a mixed nitrate of Ca, Gd, Eu, and B. The resulted mixed nitrate was filled in an alumina boat, and calcinated at a temperature of 1000° C. in air for 24 hours. Thus, a red phosphor was obtained having a composition represented by $Ca_4Gd_{0.95}Eu_{0.05}O(BO_3)_3$. This phosphor was irradiated with an ultraviolet ray using an excimer 146 nm lamp (manufactured by Ushio Inc.) in a vacuum chamber of $5 \times 10^{-2}$ Torr or less, for manifestation of emission of a light having strong red color.

What is claimed is:

1. A phosphor for a vacuum ultraviolet excitation material, obtained by adding Eu or Tb to a compound comprising Gd, Al and O, wherein 0.5 to 95 mol % of Gd is substituted by Y.

2. The phosphor according to claim 1, represented by the general formula $Gd_{1-a}Eu_aAlO_3$ wherein $0.003 \leq a \leq 0.5$ or $Gd_{1-a}Tb_aAlO_3$ wherein $0.003 \leq a \leq 0.5$, wherein 0.5 to 95 mol % of Gd is substituted by Y.

3. A vacuum ultraviolet excitation material comprising a phosphor according to claim 1.

4. A vacuum ultraviolet excitation material comprising a phosphor according to claim 2.

5. A phosphor for a vacuum ultraviolet excitation material, obtained by adding Tb to a compound comprising Gd, Al, B and O, wherein 0.5 to 95 mol % of Gd is substituted by Y.

6. A vacuum ultraviolet excitation material comprising a phosphor according to claim 5.

7. A phosphor for vacuum ultraviolet excitation material, obtained by adding Eu or Tb to a compound represented by the general formula $Gd_{1-a}Eu_aAl_3(BO_3)_4$ wherein $0.003 \leq a \leq 0.5$ or $Gd_{1-a}Th_aAl_3(BO_3)_4$ wherein $0.003 \leq a \leq 0.5$.

8. The phosphor according to claim 7 wherein 0.5 to 95 mol % of Gd is substituted by Y.

9. A vacuum ultraviolet excitation material comprising a phosphor according to claim 7.

10. A vacuum ultraviolet excitation material comprising a phosphor according to claim 8.

11. A phosphor for a vacuum ultraviolet excitation material, obtained by adding Eu to a compound comprising Gd, M, B and O, represented by the general formula $M_4Gd_{1-a}EU_aO(BO_3)_3$ wherein $0.003 \leq a \leq 0.5$, M represents one or more alkaline earth metal elements selected from the group consisting of Ca, Sr and Ba.

12. The phosphor according to claim 11 wherein 0.5 to 95 mol % of Gd is substituted by Y.

13. A vacuum ultraviolet excitation material comprising a phosphor according to claim 11.

14. A vacuum ultraviolet excitation material comprising a phosphor according to claim 12.

* * * * *